United States Patent
Saeki

(10) Patent No.: US 6,983,982 B2
(45) Date of Patent: Jan. 10, 2006

(54) FRONT VEHICLE BODY STRUCTURE

(75) Inventor: Hidetsugu Saeki, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/793,870

(22) Filed: Mar. 8, 2004

(65) Prior Publication Data
US 2004/0195863 A1 Oct. 7, 2004

(30) Foreign Application Priority Data
Apr. 3, 2003 (JP) ............................. 2003-100302

(51) Int. Cl.
B62D 25/08 (2006.01)

(52) U.S. Cl. ............ 296/192; 296/193.06; 296/203.02; 296/205

(58) Field of Classification Search ............. 296/96.21, 296/192, 203.02, 187.09, 203.01, 205, 187.03, 296/193.06
See application file for complete search history.

(56) References Cited

U.S. PATENT DOCUMENTS 1,830,081 A * 11/1931 Ball ........................ 296/192
2,269,451 A * 1/1942 Ford ........................ 296/205
4,205,872 A * 6/1980 Bollinger .................... 296/205
5,076,632 A * 12/1991 Surratt ..................... 296/96.21
5,720,511 A * 2/1998 Benedyk ................. 296/203.01
6,447,052 B2   9/2002 Saeki
6,655,728 B2 * 12/2003 Sano et al. ............ 296/187.09

FOREIGN PATENT DOCUMENTS

JP    2001-253365 A    9/2001

* cited by examiner

Primary Examiner—Dennis H. Pedder
(74) Attorney, Agent, or Firm—Shinjyu Global IP Counselors, LLP.

(57) ABSTRACT

A front vehicle body structure is configured to transmit and disperse loads imparted from a front of the vehicle body to a wider portion of the vehicle body for improving the energy absorption efficiency. A generally rectangular or C-shaped frame-like structural body is formed by a pair of upper front pillar portions, an upper cross dash portion and either the front roof rail or a pair of side roof rails. Forward-protruding box-cross-section parts are connected to the bottom end parts of the upper front pillar portions and the rear ends of hood ledge members. Lower front pillar portions are connected to the upper front pillar portions, the box-cross-section parts, the upper cross dash portion, and the side sills. The upper cross dash portion is arranged on the axes of the upper front pillar portions as seen in a side elevational view.

11 Claims, 14 Drawing Sheets

FRONT VEHICLE BODY STRUCTURE

BACKGROUND OF THE INVENTION

1. Field of the Invention

The present invention relates to a front vehicle body structure that is designed to absorb the energy of a front collision by dispersing the frontal collision loads with the body frame members.

2. Background Information

Many conventional front vehicle body structures are designed to absorb the energy of a front collision by dispersing the frontal collision loads with the body frame members. Among these conventional structures are known structures in which a load conversion transmitting structure is provided in the lower front pillar portions. Thus, a collision input imparted to the hood ledge members that is connected to the upper end parts of the lower front pillar portions is converted so as to be transmitted generally along the axial direction of the upper front pillar portions, which slant upward and rearward from the upper end parts of the lower front pillar portions. One example of this type of front vehicle body structure is disclosed in Japanese Laid-Open Patent Publication No. 2001-253365 (see, fifth page, first figure).

In view of the above, it will be apparent to those skilled in the art from this disclosure that there exists a need for an improved front vehicle body structure. This invention addresses this need in the art as well as other needs, which will become apparent to those skilled in the art from this disclosure.

SUMMARY OF THE INVENTION

It has been discovered that in the conventional front vehicle body structure just described attempts to improve the load transmission efficiency by converting the impact force imparted to the front section of the vehicle body from the hood ledge members in an axial direction of the upper front pillar portions. However, in order to achieve further reduction of the impact force at the time of a collision, it is necessary to improve the efficiency of the load dispersion and the efficiency of the collision load energy absorption.

Therefore, the object of the present invention is to provide a front vehicle body structure that can transmit and disperse loads imparted from the front of the vehicle body to a wider portion of the vehicle body and improve the energy absorption efficiency.

The present invention is basically characterized by providing a front vehicle body structure comprising a pair of upper front pillar portions, a front roof rail, an upper cross dash portion, a pair of side roof members, a pair of hood ledge members, a pair of side sills, a pair of lower front pillar portions, and a pair of box-cross-section parts. The upper front pillar portions extend upward along opposite sides of an upper half of a front cabin section. The front roof rail connects upper end parts of the upper front pillar portions. The upper cross dash portion connects lower end parts of the upper front pillar portions. The side roof members extend rearward from the upper end parts of the upper front pillar portions. The hood ledge members are arranged on opposite sides of an upper portion of a front section of a vehicle body and extending in a lengthwise direction of the vehicle body. The side sills extend in the lengthwise direction of the vehicle body on opposite sides of a floor of the vehicle body. The lower front pillar portions vertically connect the upper front pillar portions to the side sills. The box-cross-section parts protrude forwardly in a vicinity of the lower end parts of the upper front pillar portions, respectively, with front ends of the box-cross-section parts being connected to rear ends of the hood ledge members, respectively. The lower front pillar portions have upper end parts connected to the box-cross-section parts and the upper cross dash portion. The upper front pillar portions, the front roof rail, and the upper cross dash portion form a generally rectangular frame-like structural body, with the upper cross dash portion being arranged on longitudinal axes of the upper front pillar portions when viewed in side elevation.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 5(*b*) is a diagrammatical side elevational view illustrating the behavior of a vehicle body front section in accordance with the first embodiment of the present invention after the vehicle undergoes a front collision;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
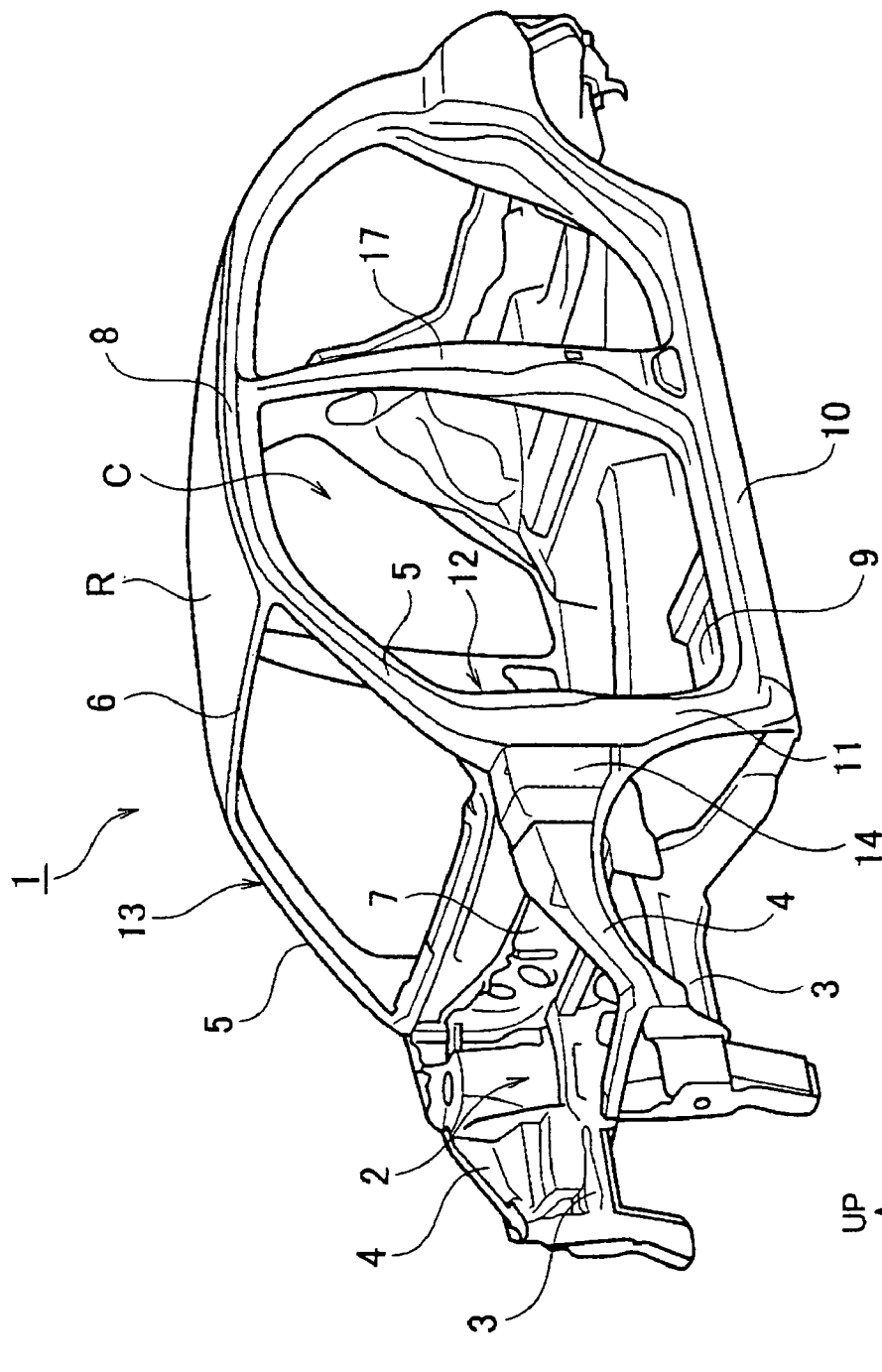
FIG. 1 is a simplified perspective view of an entire vehicle frame structure that is constructed with a front vehicle body structure in accordance with a first embodiment of the present invention.
Figure 2:
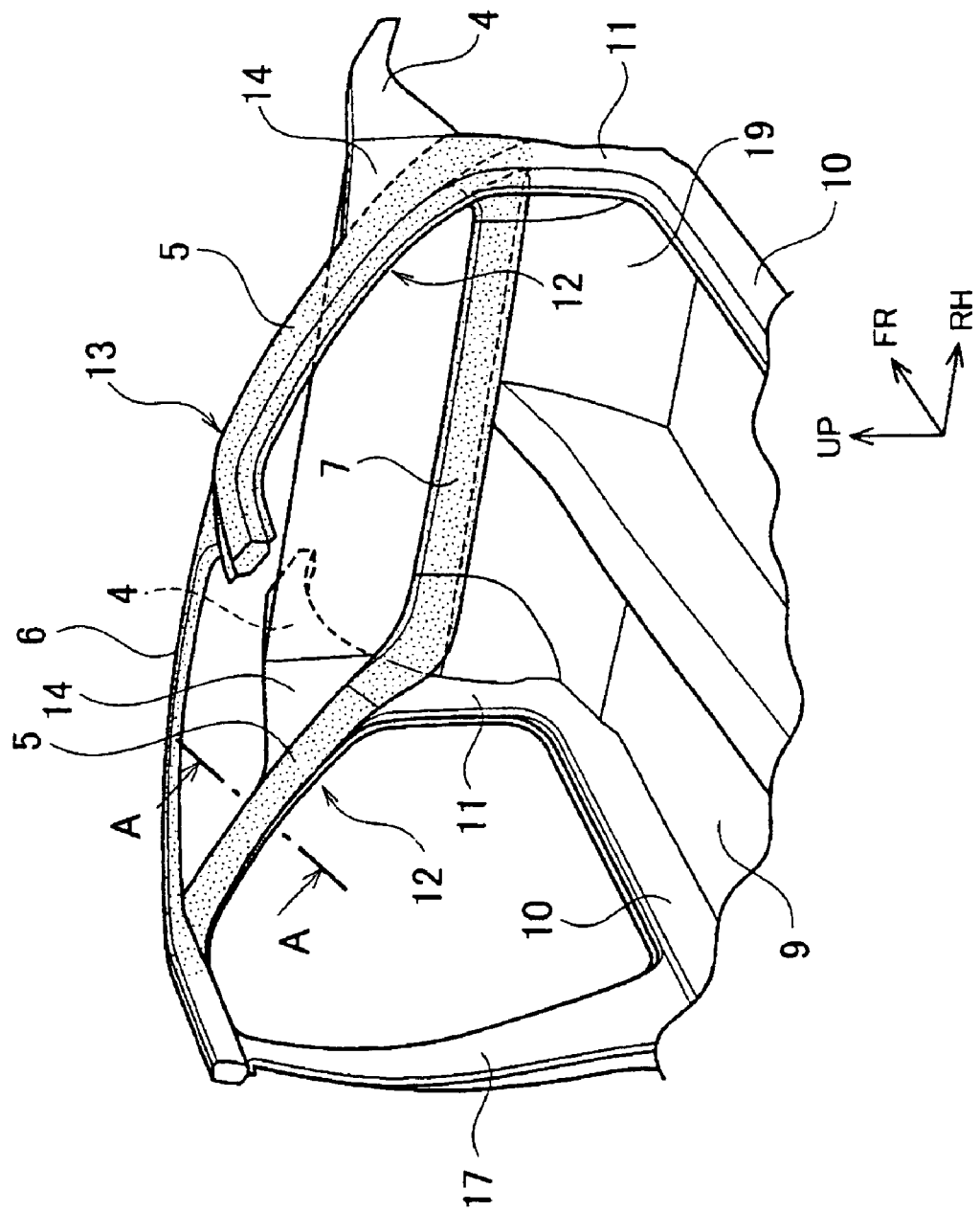
FIG. 2 is a partial perspective view of selected main structural components of the vehicle frame structure that forms the front section of the cabin in accordance with the first embodiment of the present invention.
Figure 3:
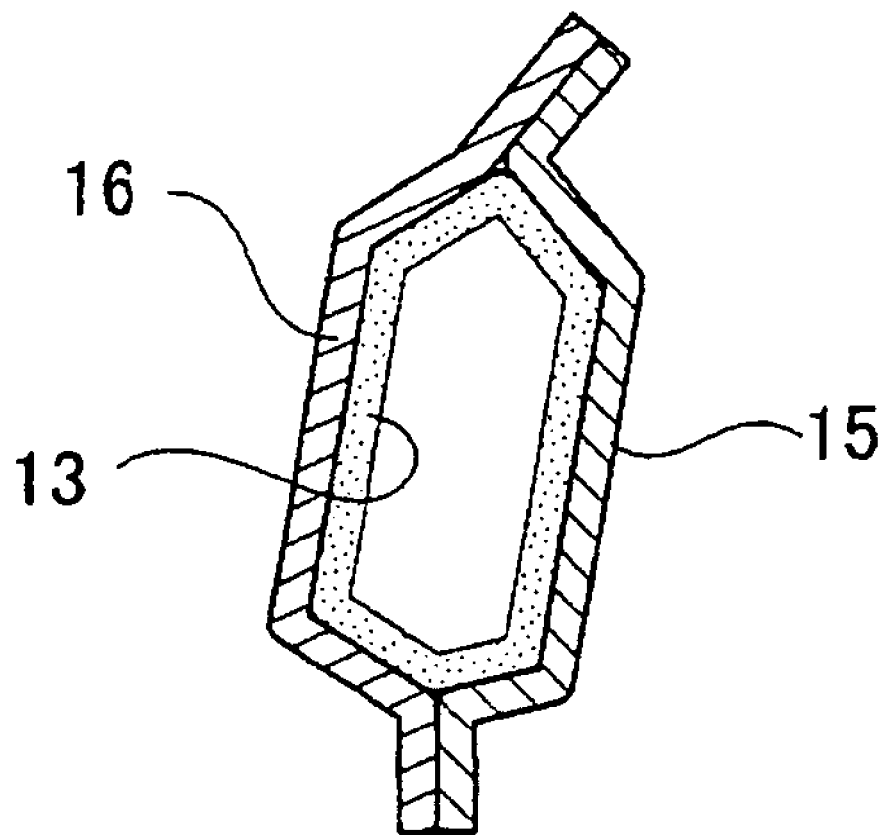
FIG. 3 is an enlarged cross sectional view of the upper front pillar portion as seen along section line A—A of FIG. 2.
Figure 4:
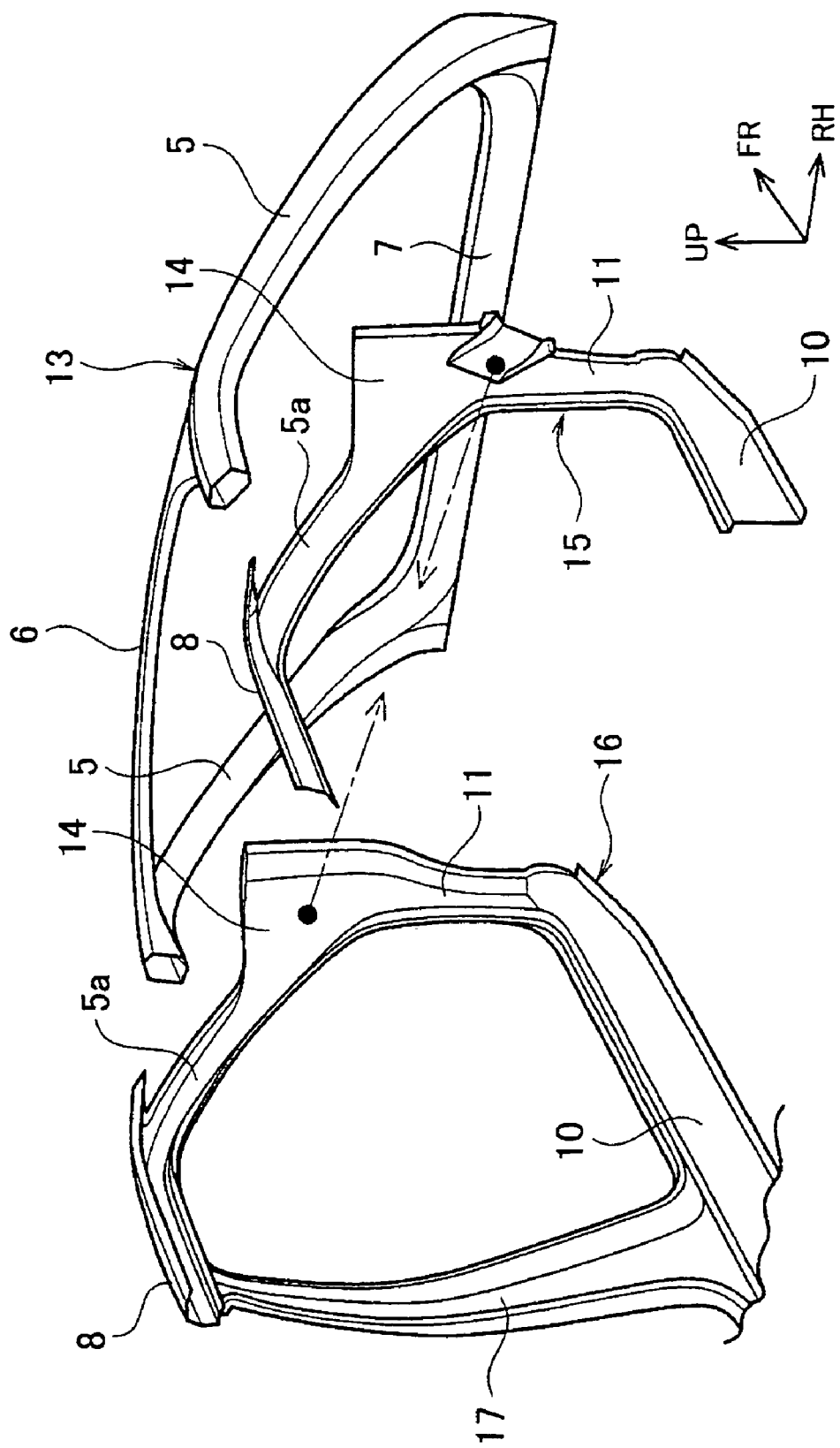
FIG. 4 is a partial exploded perspective view of the frame structure of the front section of the cabin in accordance with the first embodiment of the present invention.
Figure 5A:
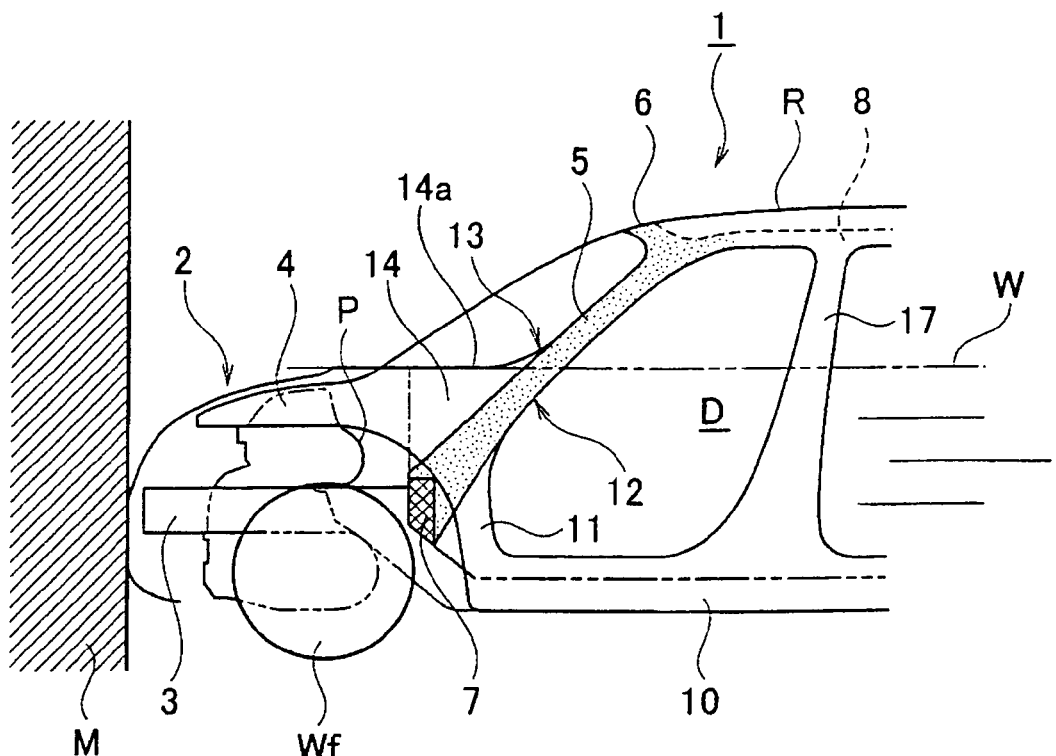
FIG. 5(*a*) is a diagrammatical side elevational view illustrating a vehicle body front section in accordance with the first embodiment of the present invention just prior to the vehicle undergoing a front collision.
Figure 5B:
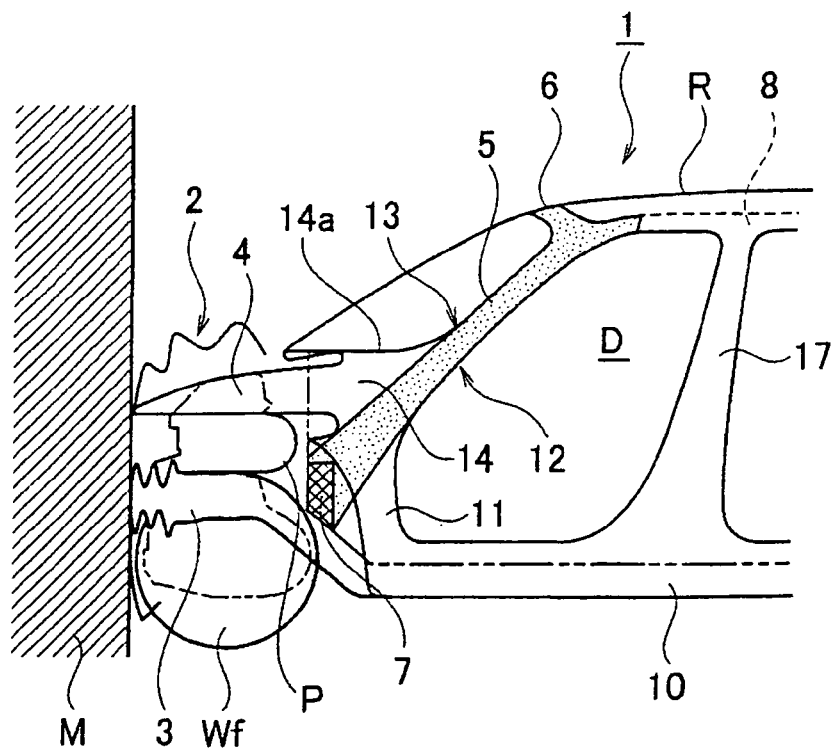

Referring to FIGS. 1 to 5(b), a vehicle body 1 is illustrated with a front vehicle body structure in accordance with a first embodiment of the present invention. FIG. 1 is a simplified perspective view of the entire frame structure of the vehicle body 1. FIG. 2 is a partial perspective view of selected main structural components of the vehicle frame structure that forms a front section of a cabin C in accordance with the first embodiment of the present invention. FIG. 3 is an enlarged cross sectional view of an upper front pillar portion as seen along section line A—A of FIG. 2. FIG. 4 is a partial exploded perspective view of the frame structure of the front section of the cabin C in accordance with the first embodiment of the present invention. FIG. 5(a) is a diagrammatical side elevational view illustrating a vehicle body front section in accordance with the first embodiment of the present invention just prior to the vehicle body 1 undergoing a front collision. FIG. 5(b) is a diagrammatical side elevational view illustrating the behavior of a vehicle body front section in accordance with the first embodiment of the present invention after the vehicle body 1 undergoes a front collision.

As shown in FIG. 1, the front section of the vehicle body 1 of the first embodiment includes a front compartment 2 with a pair of front side members 3 and a pair of hood ledge members 4. The front side members 3 extend in the lengthwise direction of the vehicle body 1 on the left and right sides of the front compartment 2. Likewise, the hood ledge members 4 extend in the lengthwise direction of the vehicle body 1 on the left and right sides of the vehicle body 1. The hood ledge members 4 are disposed above the front side members 3. The rear ends of the front side members 3 abut against a dash panel 19. Preferably, the rear ends of the front side members 3 curl underneath the dash panel 19, and are linked to side member extensions that extend rearward.

The front section of the vehicle body 1 of the first embodiment also includes a pair of upper front pillar portions 5 are arranged on the left and right sides of the upper half of the cabin C. The upper end parts of the upper front pillar portions 5 are connected by a front roof rail 6, while the lower parts of the upper front pillar portions 5 are connected by an upper cross dash portion 7 that is provided on an upper part of the dash panel 19 and arranged in the widthwise direction of the vehicle body 1. The upper end parts of the upper front pillar portions 5 are also connected to a pair of side roof rails or members 8, respectively that extend in the lengthwise direction of the vehicle body 1. Thus, the upper front pillar portions 5 are preferably arranged on the left and right sides of the upper half of the cabin C, and are slanted in a rearward direction from the upper cross dash portion 7 to the front roof rail 6.

The vehicle body 1 further includes a vehicle body floor 9 having a pair of side sills 10 provided on the left and right sides of the vehicle body floor 9. The side sills 10 extend in the lengthwise direction of the vehicle body 1. The bottom parts of the upper front pillar portions 5 and the front end parts of the side sills 10 are connected in the vertical direction by a pair of lower front pillar portions 11. The lower front pillar portions 11 and the upper front pillar portions 5 constitute a pair of front pillars 12 of the front section of the vehicle body 1.

As shown in FIG. 2, in this first embodiment, a generally rectangular frame-like structural body 13 is created by the upper front pillar portions 5, the front roof rail 6, and the upper cross dash portion 7. Preferably, as shown in FIGS. 2 and 4, the upper front pillar portions 5, the front roof rail 6, and the upper cross dash portion 7 are formed as a single integral unit to create the rectangular frame-like structural body 13. The rectangular frame-like structural body 13 is made, for example, by making the upper front pillar portions 5, the front roof rail 6 and the upper cross dash portion 7 into a single integral unit having a continuous closed cross sectional structure and applying a hydraulic forming method in which fluid pressure (e.g., water pressure) is used to expand the material to the desired shape.

The front section of the vehicle body 1 of the first embodiment also includes a pair of forwardly protruding box-cross-section parts 14. The box-cross-section parts 14 are provided in the vicinity of the lower end parts of the upper front pillar portions 5. The front ends of the box-cross-section parts 14 are connected to the rear ends of the hood ledge members 4. The upper parts of the lower front pillar portions 11 are connected to the box-cross-section parts 14 and the upper cross dash portion 7. The upper cross dash portion 7 is arranged on the axes of the upper front pillar portions 5 as seen in a side elevational view. Thus, impact forces or input loads from a front collision are directly transmitted from the upper cross dash portion 7 along the axes of the upper front pillar portions 5. In other words, regarding the transmission and dispersion of input loads to the upper front pillar portions 5, the efficiency of load dispersion from the upper cross dash portion 7 to the upper front pillar portions 5 can be improved because the upper cross dash portion 7 is arranged on the axes of the upper front pillar portions 5 as seen in a side elevational view.

As shown in FIGS. 3 and 4, each of the upper front pillar portions 5 of the rectangular frame-like structural body 13 is sandwiched and secured between the cross sectional insides of an inner member 15 and an outer member 16 that form a closed cross sectional structure, i.e., the front pillar 12, which also has a closed cross sectional structure. The inner member 15 and the outer member 16 are each press-formed such that the inside and outside parts of the lower front pillar portion 11 and the box-cross-section part 14 are made as an integral one-piece unit. The upper front pillar portions 5 (which rise from the box-cross-section parts 14) of the rectangular frame-like structural body 13 are arranged so as to pass between portions 5a of the inner and outer members 15 and 16 that correspond to the upper front pillar portions 5.

Preferably, the inside parts of the side roof member 8, the portion 5a corresponding to the upper front pillar portion 5, the lower front pillar portion 11, the box-cross-section part 14, and a portion of the side sill 10 are formed as a single integral, one-piece unit by the inner member 15. Meanwhile, the side roof member 8, the portion 5a corresponding to the upper front pillar portion 5, the lower front pillar portion 11, the box-cross-section part 14, the side sill 10, and the center pillar 17 are formed as a single integral, one-piece unit by the outer member 16.

As shown in FIG. 5(a), in this embodiment, the upper cross dash portion 7 is arranged to face opposite the rear ends of the front side members 3. Also, the upper surfaces 14a of the box-cross-section parts 14 are positioned close to the waistline W of the vehicle body 1 and the entireties of the box-cross-section parts 14 are arranged almost completely below the waistline W. More preferably, completely below the box-cross-section parts 14 are positioned completely below the waistline W with the upper surfaces 14a of the box-cross-section parts 14 disposed close to the waistline W of the vehicle body 1. The term "almost completely below the waistline" as used herein refers to the box-cross-section parts 14 having part or all of the upper surfaces 14a of the box-cross-section parts 14 being deposed slightly above the waistline W.

As shown in FIGS. 5(a) and 5(b), when a vehicle body 1 provided with a front vehicle body structure in accordance with the first embodiment is subjected to a front collision with an obstacle M, the front compartment 2 collapses and the inputs from the power unit P installed in the front compartment 2, the front wheels Wf, and the front side members 3 are born by the upper cross dash portion 7 and the lower front pillar portions 11. When this occurs, the collision loads imparted to the upper cross dash portion 7 and the lower front pillar portions 11 can be dispersed by being transmitted to the upper front pillar portions 5 (which are integral with the upper cross dash portion 7 and form part of the rectangular frame-like structural body 13) and the side sills 10 (which are connected to the lower front pillar portions 11). In other words, with the present invention, impact forces imparted to the power unit P installed in the front compartment, the front wheels Wf, and the front side members 3 during a front collision are directed to the upper cross dash portion 7 and the lower front pillar portions 11 and, then, dispersed by transmitting them to the side sills 10 and the upper front pillar portions 5.

In particular, regarding the transmission and dispersion of input loads to the upper front pillar portions 5, the efficiency of load dispersion from the upper cross dash portion 7 to the upper front pillar portions 5 can be improved because the upper cross dash portion 7 is arranged on the axes of the upper front pillar portions 7 in a side elevational view. In other words, the longitudinal axes of the upper front pillar portions 7 pass through the upper cross dash portion 7 as seen in the side elevational views of FIGS. 5(a) and 5(b).

The load of a frontal collision is also imparted to the hood ledge members 4 in the axial direction thereof. Since the box-cross-section parts 14 (which protrude forward from a bottom part of the upper front pillar portions 5) deform as the hood ledge members 4 push them rearward as shown in FIG. 5(b), the collision energy can be absorbed efficiently while avoiding extreme load increases and maintaining the shape of the door opening D formed by the front pillars 12.

From the standpoint of suppressing deformation of the front pillars 12, it is desirable to slant the upper front pillar portions 5 more rearward than in conventional structures. The effect of this rearward slanting on the ease with which passengers can get into and out of the vehicle is minimized by providing ample space in the leg and head regions because such space is critical with respect to getting into and out of the vehicle.

Since the loads transmitted to the upper front pillar portions 5 can be reliably transmitted to the front roof rail 6 in addition to the side roof members 8, shear deformation of the roof panel R resulting from off-centered input, as is seen in offset collisions, can also be suppressed.

In addition to the operational effects of the first embodiment just described, the efficiency with which loads are transmitted from the upper cross dash portion 7 to the upper front pillar portions 5 and onto the front roof rail 6 can be improved even further because the upper front pillar portions 5, the front roof rail 6, and the upper cross dash portion 7 of the rectangular frame-like structural body 13 are formed as an integral unit.

Since the rectangular frame-like structural body 13 is made by forming a structure having a continuous closed cross section and applying a hydraulic forming method, the rectangular frame-like structural body 13 can be made into any desired rectangular shape and provided with a completely closed cross sectional structure having joined portions.

Since each of the upper front pillar portions 5 of the rectangular frame-like structural body 13 is sandwiched and secured between the members 15 and 16 which are joined together to form the front pillar 12 (which has a closed cross sectional structure), the upper front pillar portions 5 are provided with a dual structure comprising the upper front pillar portions 5 and the inner and outer members 15 and 16. Thus, the strength and rigidity of those portions can be increased. Also, the shape can be simplified and the productivity can be improved because it is not necessary to provide a flange on the rectangular frame-like structural body 13 for mounting the front windshield and the welt.

Since the upper cross dash portion 7 is arranged to face opposite the rear ends of the front side members 3 (which extend in the lengthwise direction of the vehicle on the left and right sides of the vehicle body front section), collision loads imparted through the front side members 3 can be supported directly by the upper cross dash portions 7. Thus, the efficiency with which loads are transmitted to the upper front pillar portions 5 and the side sills 10 can be increased.

Since the upper surfaces 14a of the box-cross-section parts 14 are positioned close to the waistline W of the vehicle and the entireties of the box-cross-section parts 14 are arranged almost completely below the waistline W, the height of the hood ledge members 4 connected to the box-cross-section parts 14 can be set to the same height as vehicles having conventional structures and, thus, the degree of design freedom of the vehicle can be increased.

As mentioned above, the inner member 15 forms an inner side of the following portions as a single one-piece, integral unit: the side roof member 8, a portion corresponding to the upper front pillar portion 5, the lower front pillar portion 11, the box-cross-section part 14, and a portion of the side sill 10. Meanwhile, the outer member 16 forms an outer side of the following as a single integral unit: the side roof member 8, a portion corresponding to the upper front pillar portion 5, the lower front pillar portion 11, the box-cross-section part 14, the side sill 10, and the center pillar 17. Consequently, the number of parts can be reduced, reductions in strength and rigidity between the members can be suppressed, and the efficiency with which loads are transmitted and dispersed can be improved.

Second Embodiment

Figure 6:
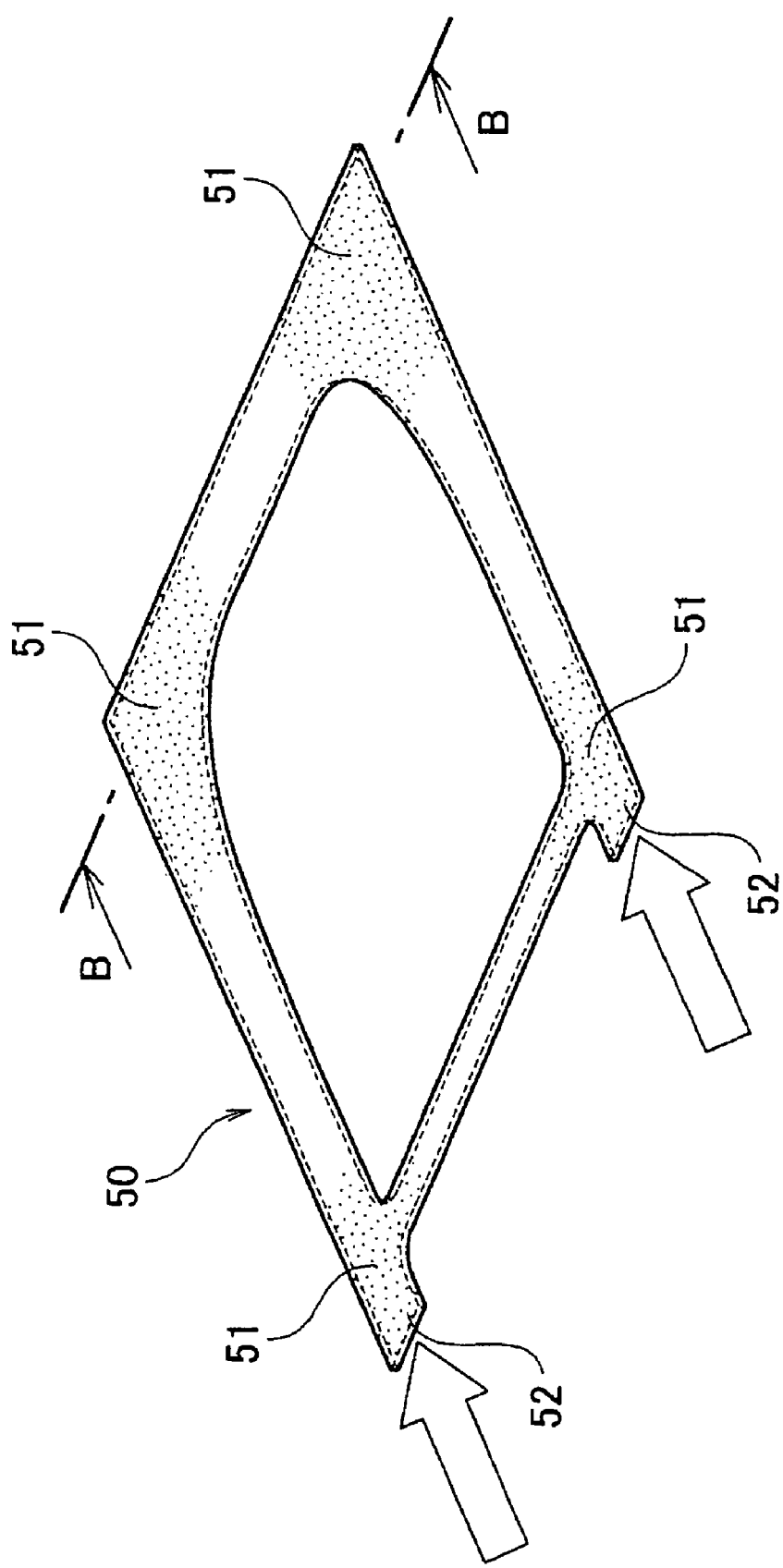
FIG. 6 is a perspective view showing the die punched shape of a sheet material from which a rectangular frame-like structural body will be made in accordance with a second embodiment of the present invention.
Figure 7:
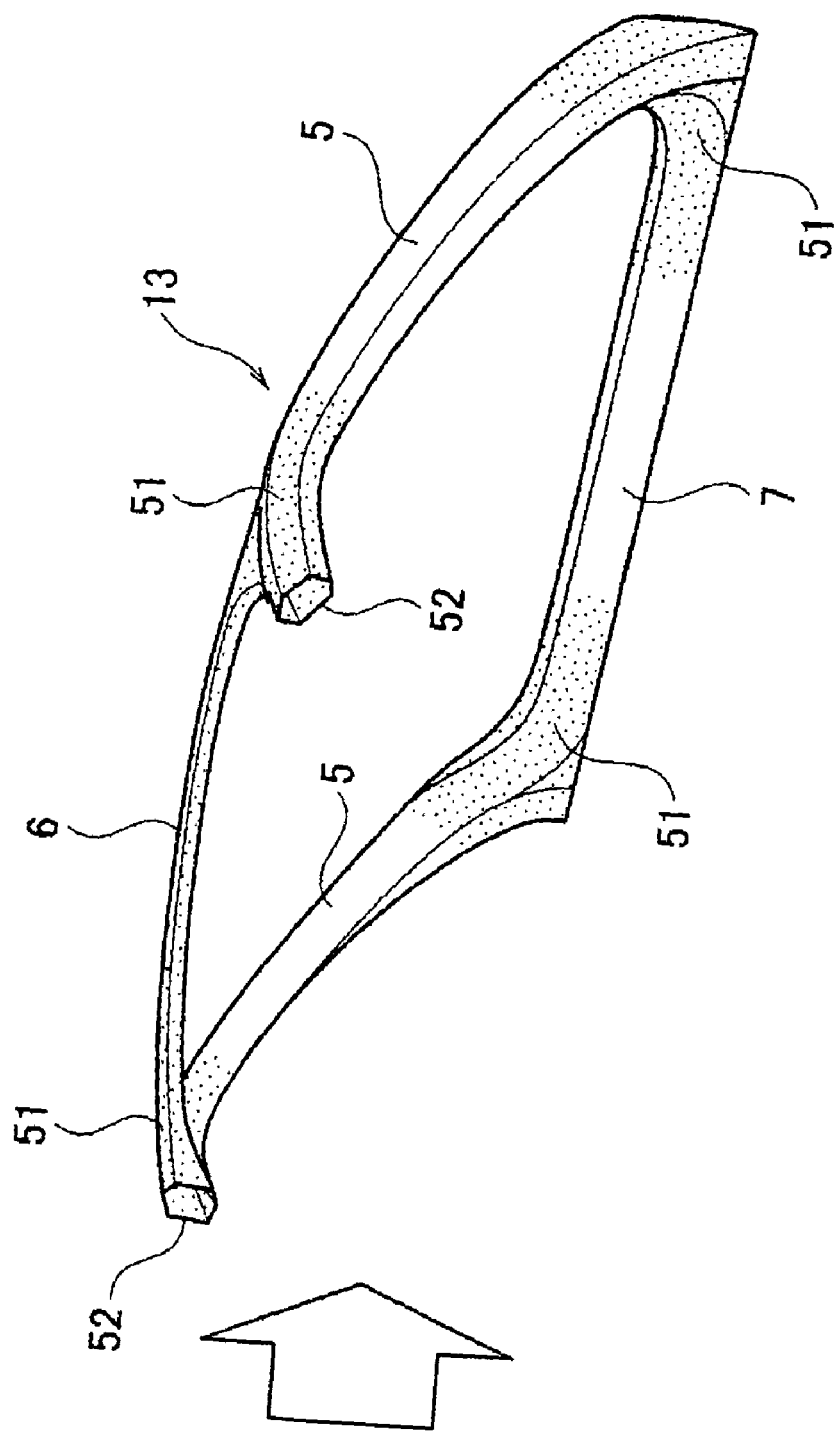
FIG. 7 is a perspective view of a completed rectangular frame-like structural body in accordance with the second embodiment of the present invention.
Figure 8:
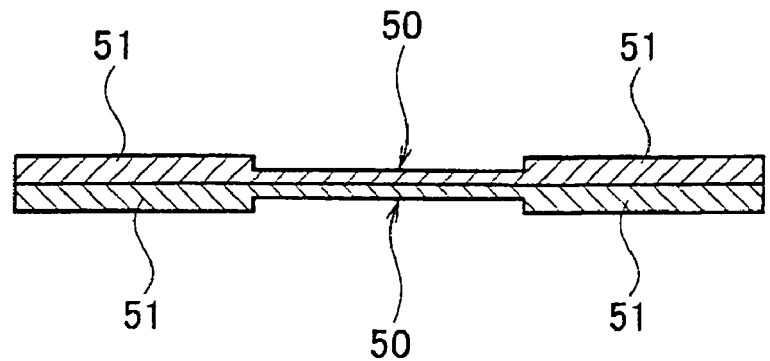
FIG. 8 is a cross sectional view of the sheet material from which a rectangular frame-like structural body will be made as seen along section line B—B of FIG. 6.

Referring now to FIGS. 6 to 8, a front vehicle body structure in accordance with a second embodiment will now be explained. FIG. 6 is a perspective view showing the die punched shape of a sheet material from which a rectangular frame-like structural body will be made. FIG. 7 is a perspective view of a completed rectangular frame-like structural body. FIG. 8 is a cross sectional view taken along section line B—B of FIG. 6. Except for the differences explained below, the structure of this embodiment is incorporated in vehicle body of the first embodiment as discussed above. In view of the similarity between the first and second embodiment embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

As shown in FIGS. 6 and 7, in the front vehicle body structure according to the second embodiment, the rectangular frame-like structural body 13 is made of a pair of thickness-varied steel sheets 50 whose thicknesses are varied in a localized manner. The thick portions 51 (the shaded portions in the FIGS. 6 and 7) of the thickness-varied steel sheets 50 are arranged in places where the rectangular frame-like structural body 13 requires reinforcement.

The rectangular frame-like structural body 13 shown in FIG. 7 has a two-sheet structure as shown in FIG. 8, both sheets being cut into a generally rectangular shape as shown in FIG. 6. Except for the hydraulic pressure injecting openings 52 indicated with arrows in FIG. 6, the edges of the two thickness-varied steel plates 50 are sealed by seam welding or the like. Then hydraulic pressure is introduced through the hydraulic pressure injecting openings 52 and the structure is expanded to achieve, i.e., hydraulically form, the rectangular frame-like structural body 13 shown in FIG. 7.

When the rectangular frame-like structural body 13 is hydraulically formed in this manner, the thick portions 51 are arranged at the corners (i.e., the four corners of the rectangular frame-like structural body 13) because the corners the portions that require reinforcement.

A front vehicle body structure in accordance with the second embodiment provides a practical solution for increasing the strength. Since the rectangular frame-like structural body 13 is made using thickness-varied steel sheets 50 and the thick portions 51 are arranged at the corners, the strength distribution of the rectangular frame-like structural body 13 can be controlled without using other reinforcing materials and the corners, where large moments occur, can be reinforced easily and reliably.

Third Embodiment

Figure 9:
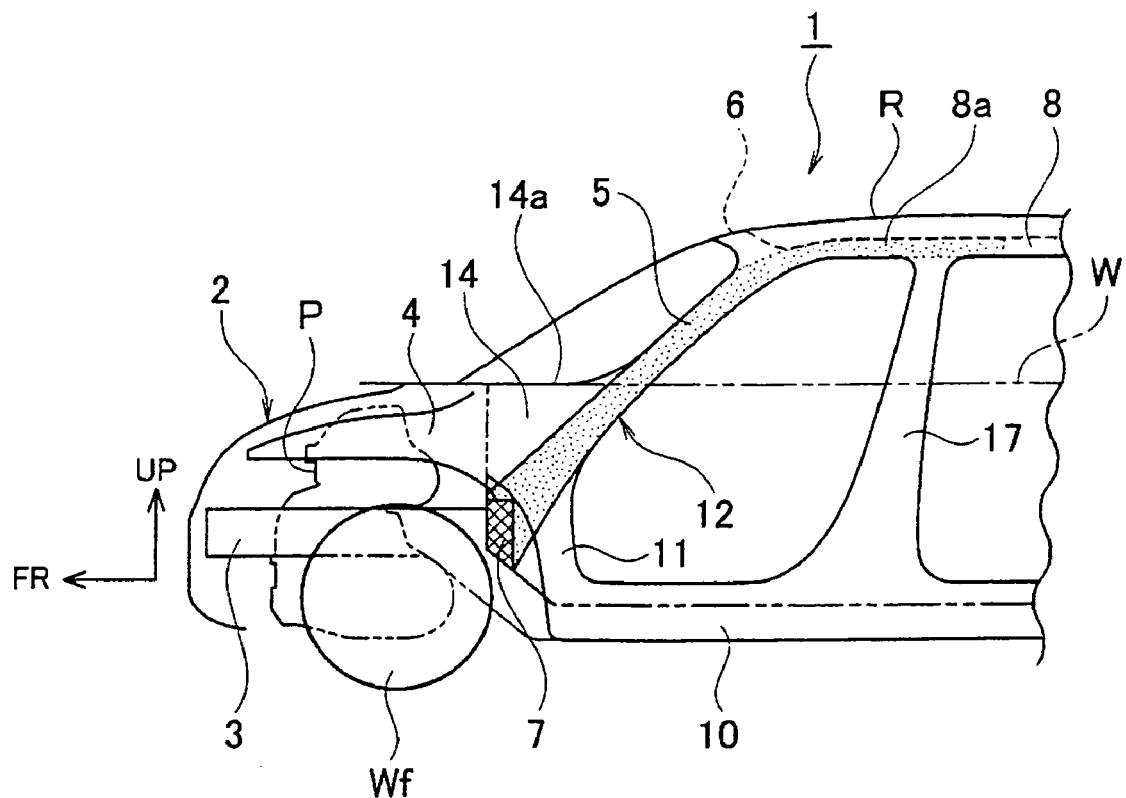
FIG. 9 is a diagrammatical side elevational view of a vehicle body front section in accordance with a third embodiment of the present invention.
Figure 10:
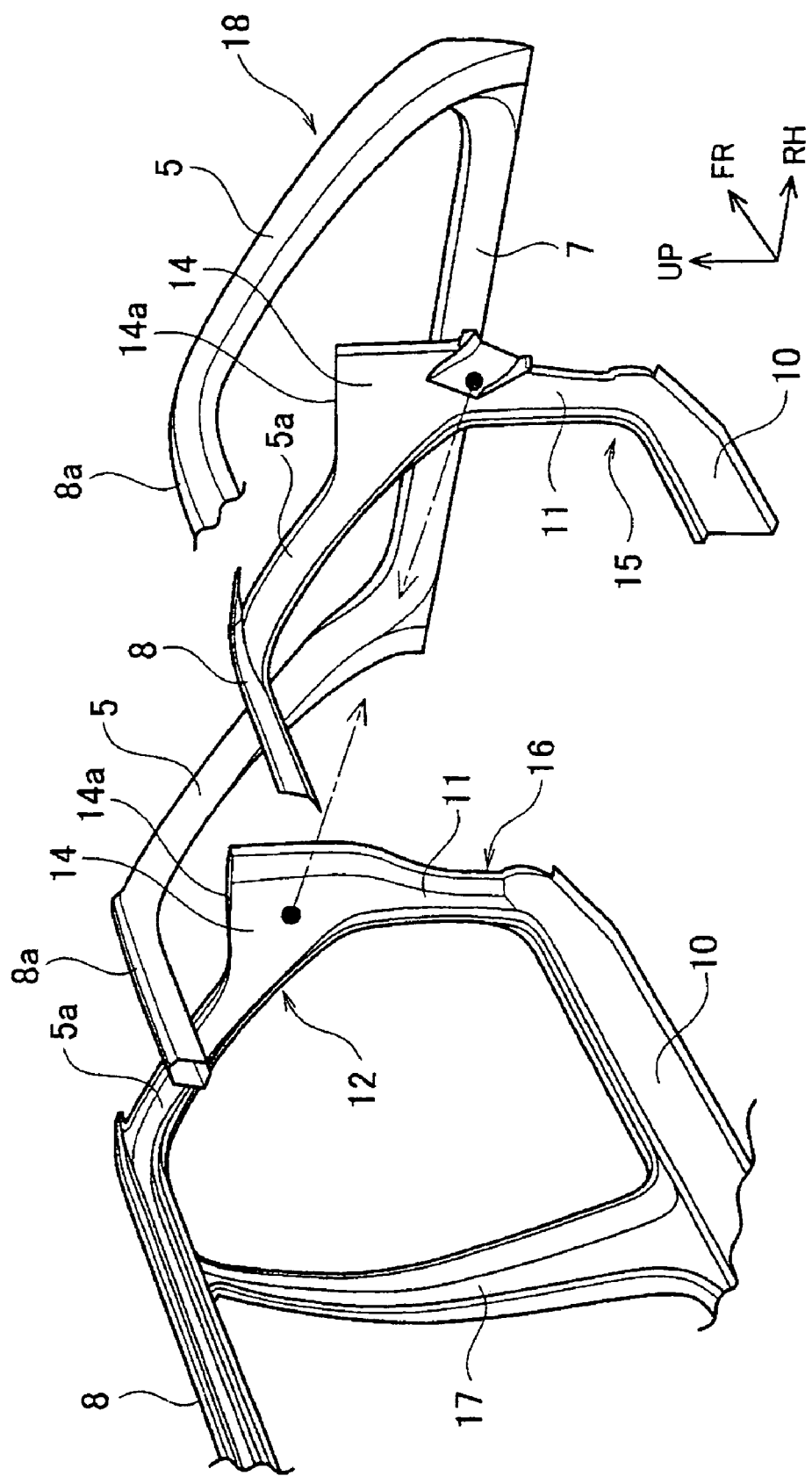
FIG. 10 is a partial exploded perspective view of the frame structure of the front section of the cabin in accordance with the third embodiment of the present invention.

Referring now to FIGS. 9 and 10, a front vehicle body structure in accordance with a third embodiment will now be explained. FIG. 9 is a partial side elevational view of the vehicle body front section, while FIG. 10 is a partial exploded perspective view of the frame structure of the front cabin section. Except for the differences explained below, the structure of this embodiment is incorporated in vehicle body 1 of the first embodiment as discussed above. In view of the similarity between the second embodiment and the previous embodiments, the parts of the third embodiment that are identical to the parts of the previous embodiments will be given the same reference numerals as the parts of the previous embodiments. Moreover, the descriptions of the parts of the third embodiment that are identical to the parts of the previous embodiments may be omitted for the sake of brevity.

As shown in FIG. 9, the vehicle body 1 of the third embodiment, like that of the first embodiment, is provided with the upper front pillar portions 5, the front roof rail 6, the upper cross dash portion 7, the side roof members 8, the hood ledge members 4, the side sills 10, the lower front pillar portions 11, and the center pillars 17.

As shown in FIG. 10, the upper front pillar portions 5, the upper cross dash portion 7, and a pair of side roof rails 8*a* of the third embodiment form a C-shaped frame-like structural body 18.

Similarly to the first embodiment, in the third embodiment, the forwardly protruding box-cross-section parts 14 are provided in the vicinity of the lower end parts of the upper front pillar portions 5 with the front ends of the box-cross-section parts 14 being connected to the rear ends of hood ledge members 4. The upper parts of the lower front pillar portions 11 connect to the box-cross-section parts 14 and the upper cross dash portion 7. The upper cross dash portion 7 is arranged on the axes of the upper front pillar portions 5 in a side elevational view.

The upper front pillar portions 5, the upper cross dash portion 7, and the side roof rails 8*a* are formed as a single integral unit to create the C-shaped frame-like structural body 18. The C-shaped frame-like structural body 18 is made using a hydraulic forming method such that the upper front pillar portions 5 and the side roof rails 8*a* have a continuous closed cross sectional structure.

The side roof rails 8*a* of the C-shaped frame-like structural body 18 are arranged such that they are positioned at the upper end parts of the center pillars 17 and terminate at or farther rearward than the upper end parts of the center pillars 17.

The upper front pillar portions 5 and the side roof rail 8*a* of the C-shaped frame-like structural body are sandwiched and secured between the cross sectional insides of the members 15 and 16. The front pillars 12 and the side roof members 8, which have closed cross sectional structures, are formed when the inner members 15 are joined with the outer members 16 so as to surround the upper front pillar portions 5 and the side roof rail 8*a*.

In the third embodiment, the upper cross dash portion 7 is also arranged to face opposite the rear ends of the front side members 3. Also, the upper surfaces 14*a* of the box-cross-section parts 14 are positioned close to the waistline W of the vehicle body 1 and the entireties of the box-cross-section parts 14 are arranged completely below or almost completely below the waistline W.

In the third embodiment, similarly to the second embodiment shown in FIGS. 6 to 8, it is preferred that the C-shaped frame-like structural body 18 be made of a thickness-varied steel sheets 50 whose thicknesses are varied in a localized manner and that the thick portions 51 of the thickness-varied steel sheet 50 be arranged in places where the C-shaped frame-like structural body 18 requires reinforcement (i.e., the corners).

A front vehicle body structure in accordance with the third embodiment provides the same operational effects as the first embodiment because the upper front pillar portions 5, the upper cross dash portion 7, and the side roof rails 8*a* constitute a C-shaped frame-like structural body 18.

Thus, in a frontal collision, the inputs from the power unit P installed in the front compartment 2, the front wheels Wf, and the front side members 3 are born by the upper cross dash portion 7 and the lower front pillar portions 11. When this occurs, the collision loads are transmitted and dispersed from the upper cross dash portion 7 to the upper front pillar portions 5 and the side roof members 8 and from the lower front pillar portions 11 to the side sills 10.

Since the upper cross dash portion 7 is arranged on the axes of the upper front pillar portions 5 in a side elevational view, the efficiency with which loads are dispersed from the upper cross dash portion 7 to the upper front pillar portions 5 can be improved. Regarding input from the hood ledge members 4, the deformation of the box-cross-section parts 14 enables the collision energy to be absorbed efficiently while maintaining the shapes of the door openings D formed by the front pillars 12.

The efficiency with which loads are transmitted from the upper cross dash portion 7 to the upper front pillar portions 5 and onto the side roof members 8 can be improved even further because the upper front pillar portions 5, the upper cross dash portion 7, and the side roof rails 8a of the C-shaped frame-like structural body 18 are formed as an integral unit. Also, since the C-shaped frame-like structural body 18 is made by forming a structure having a continuous closed cross section and applying a hydraulic forming method, the strength and rigidity of the C-shaped frame-like structural body 18 can increased even further.

Since the upper front pillar portion 5 and the side roof rails 8a of the C-shape frame-like structural body 18 are sandwiched and secured between the cross sectional insides of the inner members 15 and the outer members 16 to achieve a dual structure, the strength and rigidity of those portions can be increased. Also, since the upper cross dash portion 7 is arranged to face opposite the rear ends of the front side members 3 (which extend in the lengthwise direction of the vehicle on the left and right sides of the vehicle body front section), the efficiency with which loads are transmitted to the upper front pillar portions 5 and the side sills 10 can be increased.

Since the upper surfaces 14a of the box-cross-section parts 14 are positioned close to the waistline W of the vehicle and the entireties of the box-cross-section parts 14 are arranged completely below or almost completely below the waistline W, the degree of design freedom of the vehicle body 1 can be increased similarly to the first embodiment.

Similarly to the first embodiment, in the third embodiment, the inner member 15 forms an inner side of the following as a single one-piece, integral unit: the side roof member 8, the portion 5a corresponding to the upper front pillar portion 5, the lower front pillar portion 11, the box-cross-section part 14, and a portion of the side sill 10. Meanwhile, the outer member 16 forms an outer side of the following as a single one-piece, integral unit: the side roof member 8, a portion 5a corresponding to the upper front pillar portion 5, the lower front pillar portion 11, the box-cross-section part 14, the side sill 10, and the center pillar 17. As a result, the efficiency with which loads are transmitted and dispersed can be improved even further.

In the third embodiment, the side roof rails 8a of the C-shaped frame-like structural body 18 are arranged such that they are positioned at the upper end parts of the center pillars 17 and at or farther rearward than the upper end parts of the center pillars 17. As a result, loads inputted from the upper front pillar portions 5 to the side roof members 8 can be reliably transmitted to the center pillars 17 and the rigidity of the cabin C can be increased with respect to front collisions.

Fourth Embodiment

Figure 11:
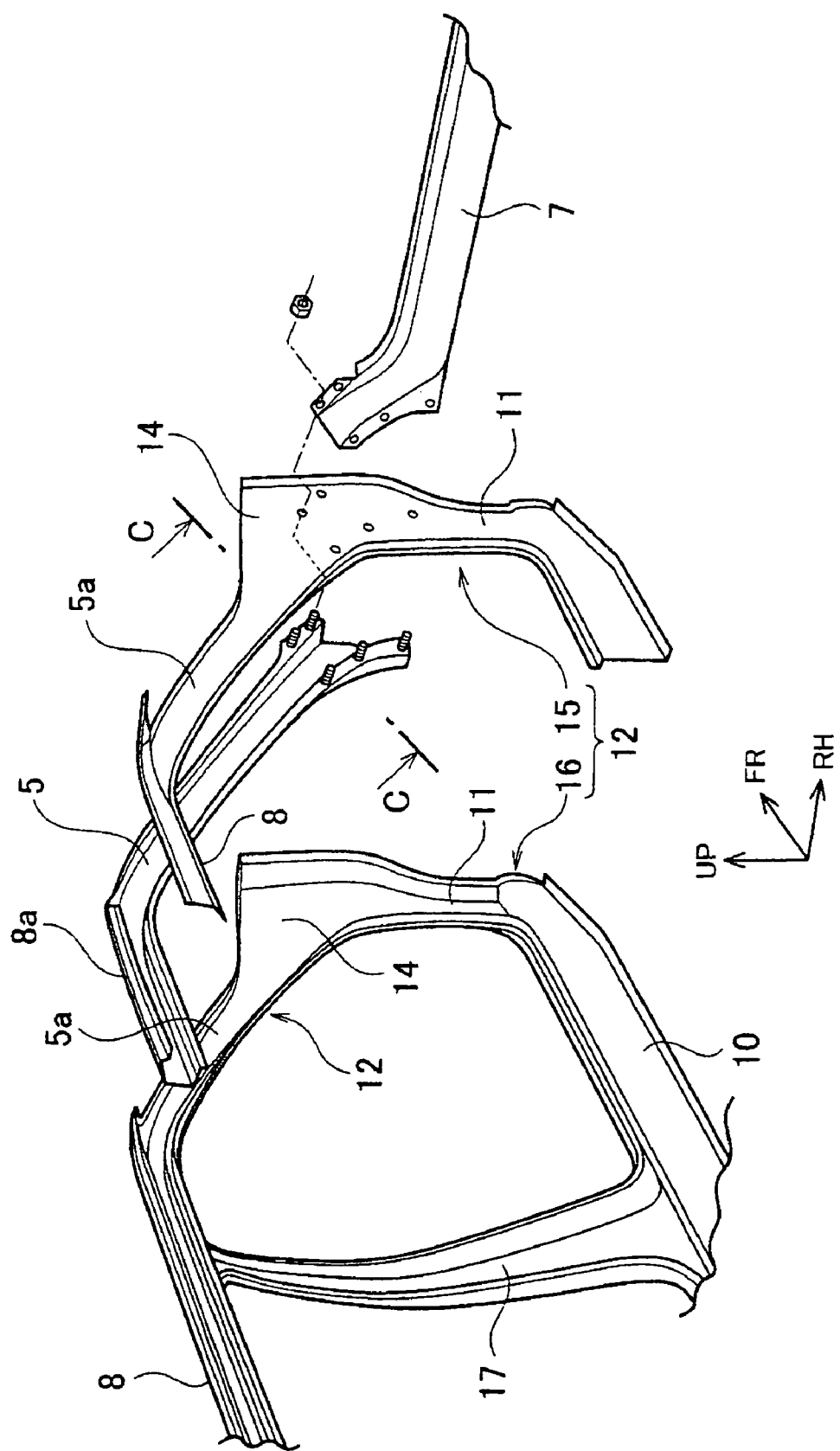
FIG. 11 is a partial exploded perspective view of the frame structure of the front section of the cabin in accordance with a fourth embodiment of the present invention.
Figure 12:
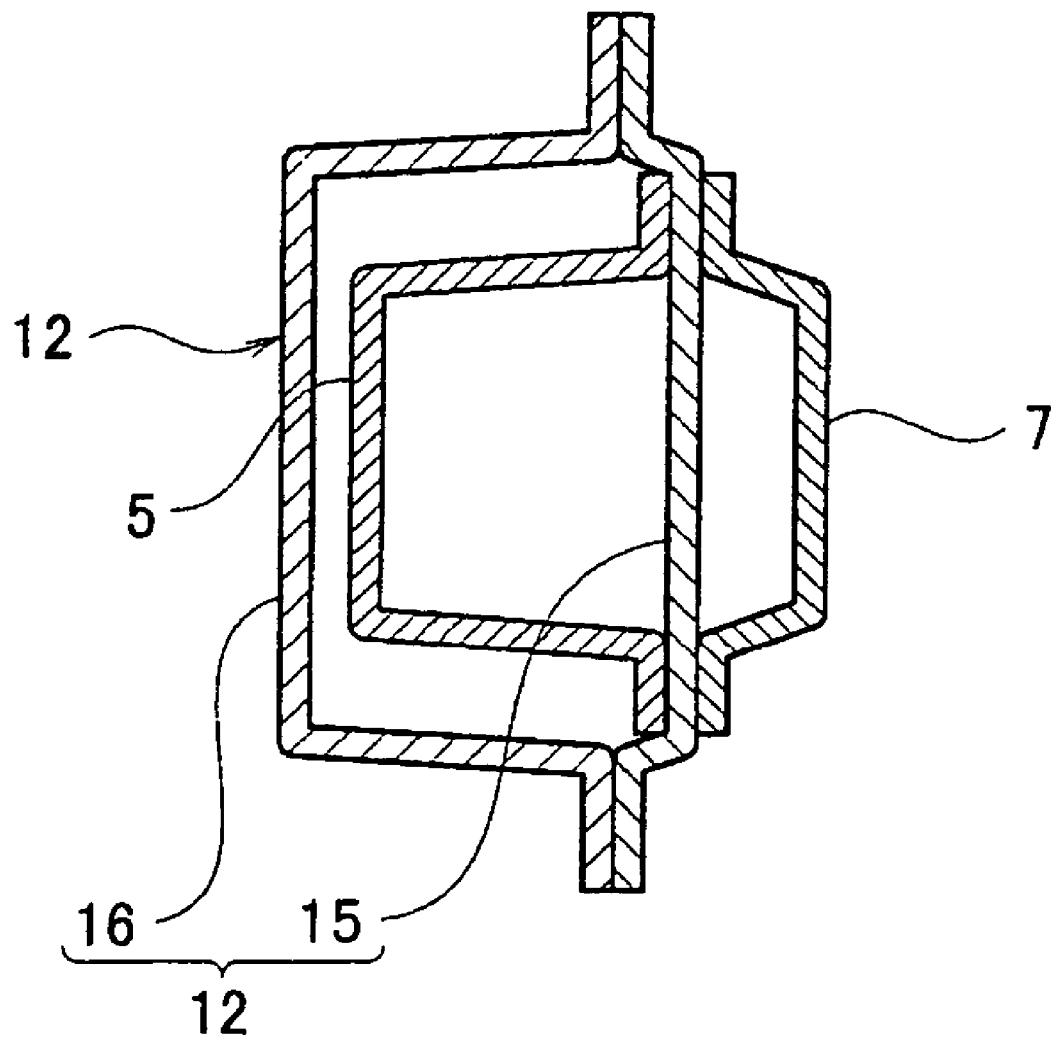
FIG. 12 is an enlarged cross sectional view of the upper front pillar portion as seen along section line C—C of FIG. 11 and showing the assembled state of the members.

Referring now to FIGS. 11 and 12, a front vehicle body structure in accordance with a fourth embodiment will now be explained. FIG. 11 is a partial exploded perspective view of the frame structure of the front cabin section, while FIG. 12 is an enlarged cross sectional view taken along section line C—C of FIG. 11 to show the assembled state of the members. Except for the differences explained below, the structure of this embodiment is incorporated in vehicle body 1 of the third embodiment as discussed above. In view of the similarity between the fourth embodiment and the previous embodiments, the parts of the fourth embodiment that are identical to the parts of the previous embodiments will be given the same reference numerals as the parts of the previous embodiments. Moreover, the descriptions of the parts of the fourth embodiment that are identical to the parts of the previous embodiments may be omitted for the sake of brevity.

As shown in FIGS. 11 and 12, in a front vehicle body structure in accordance with the fourth embodiment, the upper front pillar portions 5 and the upper cross dash portion 7 of the C-shaped frame-like structural body are made as separate members and the upper front pillar portions 5 and the upper cross dash portion 7 have generally hat-shaped open cross sections.

Each upper front pillar portion 5, along with the side roof rail 8a, is joined to the inside surface of the inner member 15 such that a closed cross section is formed, and the lower part of the upper front pillar portion 5 is connected to the upper cross dash portion 7 with bolts such that the inner member 15 is sandwiched there-between.

The upper cross dash portion 7 is joined to the dash panel 19 (see FIG. 2) in such a manner as to form a closed cross section.

The upper front pillar portions 5 and the upper cross dash portion 7, like the inner members 15 and the outer members 16, are made by press forming a sheet material made of steel, an aluminum alloy, or the like. They can also be made by cast molding an aluminum alloy or the like.

A front vehicle body structure in accordance with the fourth embodiment provides the same operational effects as the third embodiment. Additionally, forming of the parts is easier and less expensive because the upper front pillar portions 5 and the upper cross dash portion 7 are made separately and have open cross sectional shapes.

Fifth Embodiment

Figure 13:
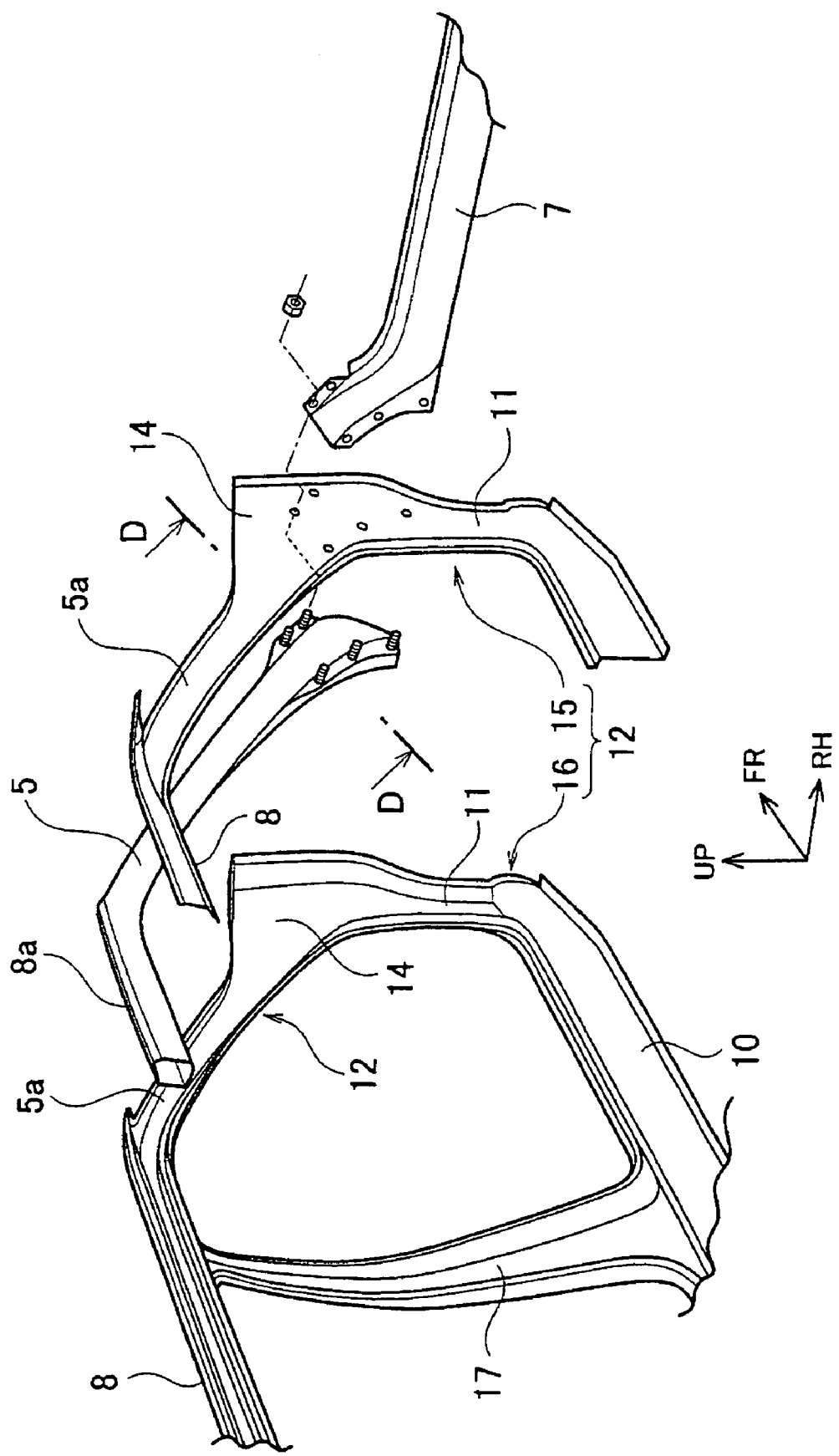
FIG. 13 is an exploded perspective view of the frame structure of the front section of the cabin in accordance with a fifth embodiment of the present invention.
Figure 14:
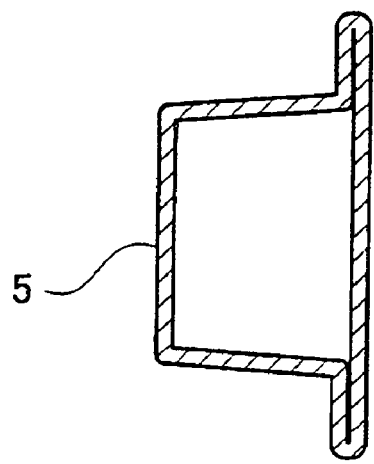
FIG. 14 is an enlarged cross sectional view of the upper front pillar portion as seen along section line D—D of FIG. 13.

Referring now to FIGS. 13 and 14, a front vehicle body structure in accordance with a fifth embodiment will now be explained. FIG. 13 is a partial exploded perspective view of the frame structure of the front cabin section, while FIG. 14 is an enlarged cross sectional view taken along the line D—D of FIG. 13 to show the assembled state of the members. Except for the differences explained below, the structure of this embodiment is incorporated in vehicle body 1 of the first embodiment as modified by the other embodiments as discussed above. In view of the similarity between the fifth embodiment and the previous embodiments, the parts of the fifth embodiment that are identical to the parts of the previous embodiments will be given the same reference numerals as the parts of the previous embodiments. Moreover, the descriptions of the parts of the fifth embodiment that are identical to the parts of the previous embodiments may be omitted for the sake of brevity.

As shown in FIGS. 13 and 14, in the front vehicle body structure in accordance with the fifth embodiment, the upper front pillar portion 5 and the side roof rail 8a of the fifth embodiment are made as an integral unit having a closed cross section using a hydraulic forming method. A flange portion for connecting to the end part of the upper cross dash portion 7 is provided on the front and rear edges of the lower end part of the upper front pillar portion 5 by leaving said lower end part in a flat state.

Thus, a vehicle body front end structure in accordance with the fifth embodiment provides generally the same effects as the fourth embodiment.

Sixth Embodiment

Figure 15:
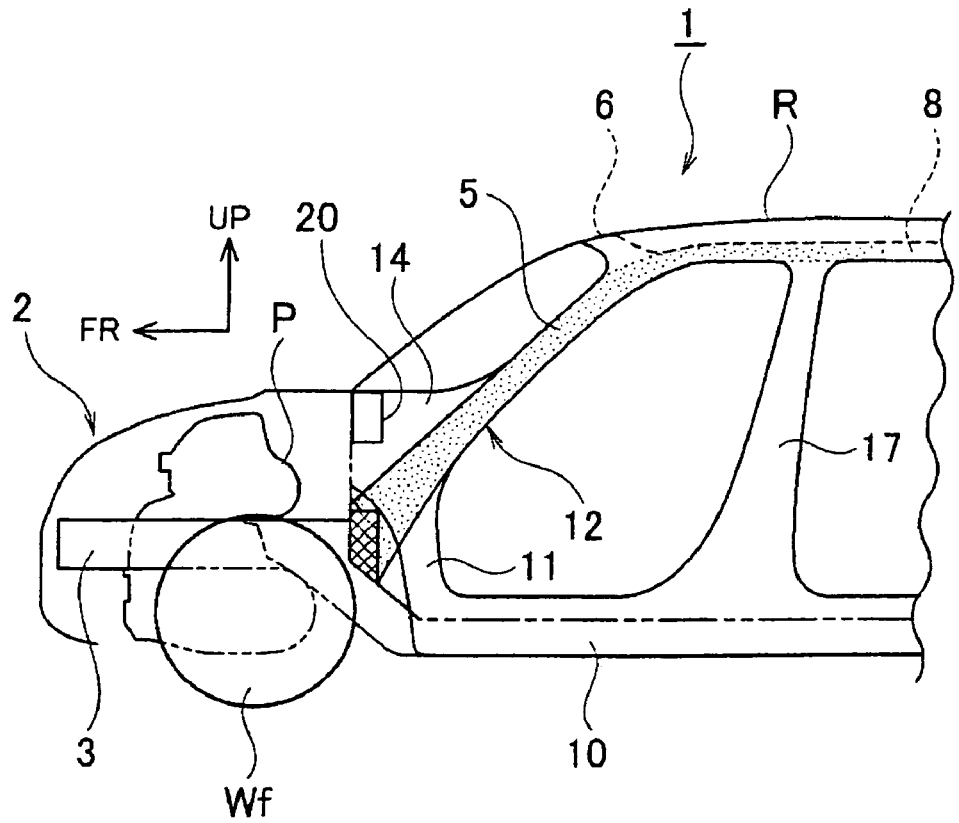
FIG. 15 is a diagrammatical side elevational view of a vehicle body front section in accordance with a sixth embodiment of the present invention.
Figure 16:
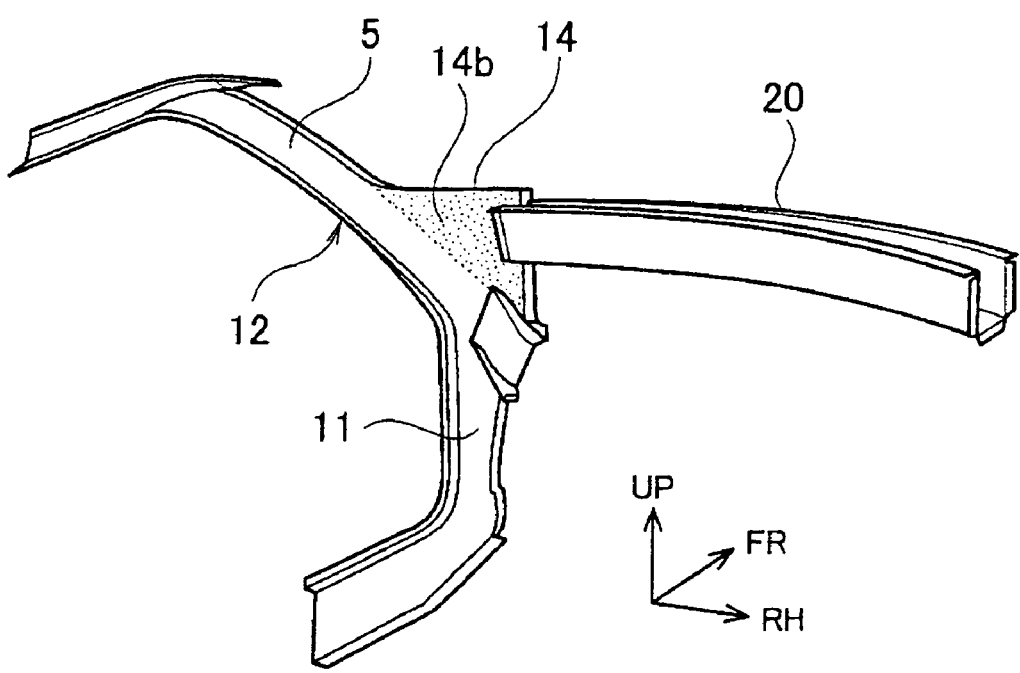
FIG. 16 is a partial exploded perspective view showing selected main components of the frame structure of the front section of the cabin in accordance with the sixth embodiment of the present invention.

Referring now to FIGS. 15 and 16, a front vehicle body structure in accordance with a sixth embodiment will now be explained. FIG. 15 is a partial side elevational view of the vehicle body front section, while FIG. 16 is a partial exploded perspective view of the frame structure of the front cabin section. Except for the differences explained below, the structure of this embodiment is incorporated in vehicle body 1 of the first embodiment as discussed above. In view of the similarity between the sixth embodiment and the previous embodiments, the parts of the sixth embodiment that are identical to the parts of the previous embodiments will be given the same reference numerals as the parts of the previous embodiments. Moreover, the descriptions of the parts of the sixth embodiment that are identical to the parts of the previous embodiments may be omitted for the sake of brevity.

As shown in FIGS. 15 and 16, in the front vehicle body structure in accordance with the sixth embodiment, the laterally inward facing surfaces 14b of the left and right box-cross-section parts 14 are connected by a cowl top member 20.

The cowl top member 20, the box-cross-section parts 14, the upper front pillar portions 5, and the front roof rail 6 support a front windshield.

With a front vehicle body structure in accordance with the sixth embodiment, the load imparted to one of the box-cross-section parts 14 during an offset collision or other collision in which a load is imparted to one side of the vehicle body 1 can be transmitted to the other side (non-collision side) through the cowl top member 20 because the left and right box-cross-section parts 14 are connected together by the cowl top member 20. As a result, the efficiency with which loads are transmitted and dispersed can be improved and the rigidity of the cabin C can be increased even further.

Also, since the windshield is supported by the cowl top member 20, the box-cross-section parts 14, the upper front pillar portions 5, and the front roof rail 6, the side edge portions of the front windshield can be curled rearward. Thus, the distance between the main plane of the front windshield and the upper front pillar portions 5 is increased and if a passenger's head should strike the windshield, the impact can be absorbed by the cracking of the windshield.

As used herein to describe previous embodiments of the present invention, the following directional terms "front, forward, rear, rearward, upper, lower, above, downward, vertical, horizontal, below and transverse" as well as any other similar directional terms refer to those directions of a vehicle body structure constructed in accordance with the present invention. Accordingly, these terms, as utilized to describe the present invention should be interpreted relative to a vehicle body structure constructed in accordance with the present invention. Moreover, terms that are expressed as "means-plus function" in the claims should include any structure that can be utilized to carry out the function of that part of the present invention. Also the terms of degree such as "substantially", "about" and "approximately" as used herein mean a reasonable amount of deviation of the modified term such that the end result is not significantly changed. For example, these terms can be construed as including a deviation of at least ±10% of the modified term if this deviation would not negate the meaning of the word it modifies.

This application claims priority to Japanese Patent Application No. 2003-100302. The entire disclosure of Japanese Patent Application No. 2003-100302 is hereby incorporated herein by reference.

While only selected embodiments have been chosen to illustrate the present invention, i.e., the first through sixth embodiments as examples, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A front vehicle body structure comprising:
   a pair of upper front pillar portions extending upward along opposite sides of an upper half of a front cabin section;
   a front roof rail connecting upper end parts of the upper front pillar portions;
   an upper cross dash portion connecting lower end parts of the upper front pillar portions;
   a pair of side roof members extending rearward from the upper end parts of the upper front pillar portions;
   a pair of hood ledge members arranged on opposite sides of an upper portion of a front section of a vehicle body and extending in a lengthwise direction of the vehicle body;
   a pair of side sills extending in the lengthwise direction of the vehicle body on opposite sides of a floor of the vehicle body;
   a pair of lower front pillar portions vertically connecting the upper front pillar portions to the side sills; and
   a pair of box-cross-section parts protruding forwardly in a vicinity of the lower end parts of the upper front pillar portions, respectively, with front ends of the box-cross-section parts being connected to rear ends of the hood ledge members, respectively,
   the lower front pillar portions having upper end parts connected to the box-cross-section parts and the upper cross dash portion,
   the upper front pillar portions, the front roof rail, and the upper cross dash portion forming a generally rectangular frame-like structural body, with the upper cross dash portion being arranged on longitudinal axes of the upper front pillar portions when viewed in side elevation,
   the upper cross dash portion being arranged adjacent to rear ends of front side members that extend forwardly from the upper cross dash portion in the lengthwise direction of the vehicle body on opposite sides of the front section of the vehicle body.

2. The front vehicle body structure as recited in claim 1, wherein
the upper front pillar portions, the front roof rail, and the upper cross dash portion forming the rectangular frame-like structural body are formed as a single integral unit.

3. The front vehicle body structure as recited in claim 1, wherein
the rectangular frame-like structural body has a continuous closed cross sectional structure that is hydraulically formed.

4. A front vehicle body structure comprising:
a pair of upper front pillar portions extending upward along opposite sides of an upper half of a front cabin section;
a front roof rail connecting upper end parts of the upper front pillar portions;
an upper cross dash portion connecting lower end parts of the upper front pillar portions;
a pair of side roof members extending rearward from the upper end parts of the upper front pillar portions;
a pair of hood ledge members arranged on opposite sides of an upper portion of a front section of a vehicle body and extending in a lengthwise direction of the vehicle body;
a pair of side sills extending in the lengthwise direction of the vehicle body on opposite sides of a floor of the vehicle body;
a pair of lower front pillar portions vertically connecting the upper front pillar portions to the side sills; and
a pair of box-cross-section parts protruding forwardly in a vicinity of the lower end parts of the upper front pillar portions, respectively, with front ends of the box-cross-section parts being connected to rear ends of the hood ledge members, respectively,
the lower front pillar portions having upper end parts connected to the box-cross-section parts and the upper cross dash portion,
the upper front pillar portions, the front roof rail, and the upper cross dash portion forming a generally rectangular frame-like structural body, with the upper cross dash portion being arranged on longitudinal axes of the upper front pillar portions when viewed in side elevation,
the upper front pillar portions of the rectangular frame-like structural body being sandwiched and secured between cross sectional insides of a pair of structural members that form front pillars having closed cross sectional structures.

5. The front vehicle body structure as recited in claim 1, wherein
the rectangular frame-like structural body is made of thickness-varied steel sheet metal having thick portions of increased thickness in a localized manner at areas of the rectangular frame-like structural body requiring reinforcement.

6. The front vehicle body structure as recited in claim 1, wherein
the box-cross-section parts are arranged almost completely below a waistline level of the vehicle with uppermost surfaces of the box-cross-section parts being arranged close to the waistline level of the vehicle body.

7. A front vehicle body structure comprising:
a pair of upper front pillar portions extending upward along opposite sides of an upper half of a front cabin section;
a front roof rail connecting upper end parts of the upper front pillar portions;
an upper cross dash portion connecting lower end parts of the upper front pillar portions;
a pair of side roof members extending rearward from the upper end parts of the upper front pillar portions;
a pair of hood ledge members arranged on opposite sides of an upper portion of a front section of a vehicle body and extending in a lengthwise direction of the vehicle body;
a pair of side sills extending in the lengthwise direction of the vehicle body on opposite sides of a floor of the vehicle body;
a pair of lower front pillar portions vertically connecting the upper front pillar portions to the side sills; and
a pair of box-cross-section parts protruding forwardly in a vicinity of the lower end parts of the upper front pillar portions, respectively, with front ends of the box-cross-section parts being connected to rear ends of the hood ledge members, respectively,
the lower front pillar portions having upper end parts connected to the box-cross-section parts and the upper cross dash portion,
the upper front pillar portions, the front roof rail, and the upper cross dash portion forming a generally rectangular frame-like structural body, with the upper cross dash portion being arranged on longitudinal axes of the upper front pillar portions when viewed in side elevation,
the box-cross-section parts having laterally inward facing surfaces connected together by a cowl top member disposed above the upper cross dash portion.

8. The front vehicle body structure as recited in claim 7, wherein
the cowl top member, the box-cross-section parts, the upper front pillar portions, and the front roof rail are configured and arranged to support a front windshield.

9. The front vehicle body structure as recited in claim 1, wherein
the lower front pillar portions and the box-cross-section parts are each formed as structural body having continuous closed cross sections by joining an inner member and an outer member with the upper front pillar portions passing through an inside area of the closed cross sections of the structural bodies.

10. The front vehicle body structure as recited in claim 9, wherein
each of the inner members at least forms an inner part of a corresponding one of the lower front pillar portions, the box-cross-section parts, and a portion corresponding to one of the side sills as a single integral unit.

11. The front vehicle body structure as recited in claim 9, wherein
each of the outer members at least forms an outer part of a corresponding one of the side roof members, a portion corresponding to one of the upper front pillar portions, the lower front pillar portions, the box-cross-section parts, the side sills, and the center pillars as a single integral unit.

* * * * *